United States Patent [19]

Park et al.

[11] Patent Number: 4,892,559
[45] Date of Patent: * Jan. 9, 1990

[54] ELECTRODE ARTICLE

[75] Inventors: George B. Park, Nr. Swindon; John A. Cook, Faringdon; Robert H. McLoughlin, Swindon, all of England

[73] Assignee: Scimat Limited, United Kingdom

[*] Notice: The portion of the term of this patent subsequent to Jun. 23, 2004 has been disclaimed.

[21] Appl. No.: 900,026

[22] Filed: Aug. 25, 1986

Related U.S. Application Data

[60] Division of Ser. No. 667,034, Nov. 1, 1984, abandoned, and a continuation-in-part of Ser. No. 618,111, Jun. 7, 1984, abandoned.

[30] Foreign Application Priority Data

Nov. 2, 1983 [GB] United Kingdom ............... 8329211
Dec. 15, 1983 [GB] United Kingdom ............... 8333387

[51] Int. Cl.$^4$ .............................................. H01M 6/00
[52] U.S. Cl. ................................. 29/623.3; 29/623.4; 429/137; 429/246
[58] Field of Search ........................ 29/623.3, 623.4; 429/246, 137

[56] References Cited

U.S. PATENT DOCUMENTS

| | | | |
|---|---|---|---|
| 2,747,009 | 5/1956 | Kirkwood et al. | 136/103 |
| 2,893,899 | 7/1959 | Balaguer | 117/230 |
| 3,092,518 | 6/1963 | Cahoon et al. | 136/146 |
| 3,485,677 | 12/1969 | Balaguer | 136/100 |
| 4,161,815 | 7/1979 | Land et al. | 29/623.3 X |
| 4,407,913 | 10/1983 | Rampel | 429/137 |
| 4,500,338 | 2/1985 | Young et al. | 106/15.05 X |
| 4,502,903 | 3/1985 | Bruder | 429/162 X |
| 4,594,299 | 6/1986 | Cook et al. | 29/623.3 X |
| 4,615,961 | 10/1986 | Park et al. | 429/218 |
| 4,625,258 | 6/1987 | McLoughlin et al. | 429/216 X |

FOREIGN PATENT DOCUMENTS

| | | |
|---|---|---|
| 1190139 | 10/1959 | France . |
| 1292298 | 3/1962 | France . |
| 2283555 | 4/1976 | France . |
| 57-46471 | 3/1982 | Japan ............... 29/623.3 |
| 1120267 | 7/1968 | United Kingdom . |
| 1360255 | 7/1974 | United Kingdom . |
| 1459681 | 12/1976 | United Kingdom . |
| 1339107 | 11/1979 | United Kingdom . |
| 1573192 | 8/1980 | United Kingdom . |

OTHER PUBLICATIONS

Chem Abs. 92:49445n (abstract of JP79-131,725), 1980.

Primary Examiner—Stephen J. Kalafut
Attorney, Agent, or Firm—Simon J. Belcher; Herbert G. Burkard

[57] ABSTRACT

Sensitive electrode material, e.g. lithium electrode material, protected by a flexible layer of material which is swellable by liquid with which it will come into contact in use, and can thus, for example, act as an electrode separator when assembled in an electrical cell containing such a liquid. The protected electrode material can be processed, e.g. rolled into thin sheets, and can conveniently be fed to automatic cell assembly apparatus.

17 Claims, 3 Drawing Sheets

ELECTRODE ARTICLE

BACKGROUND OF THE INVENTION

This application is a divisional of application Ser. No. 667,034, filed Nov. 1, 1984, now abandoned which is a continuation-in-part of applicaton Ser. No. 618,111, now abandoned filed June 7, 1984, now abandoned, the disclosures of which are incorporated herein by reference.

This invention relates to protected electrode materials and the use thereof in electrical devices.

Some electrical components, for example some electrode materials, are sensitive insofar as they are difficult to handle during manufacture of electrical devices owing to physical weakness or high chemical reactivity, which may necessitate inconvenient handling procedures and/or special conditions such as dry room assembly. Examples of such sensitive materials include alkali metals and alkaline earth metals, notably lithium metal electrodes for lithium cells.

Lithium metal is difficult to roll into thin strips for use as an electrode, and U.S. Pat. No. 3,721,113 describes a method of alleviating this difficulty by rolling the lithium between smooth (surface asperities less than one micron) polymeric surfaces having sufficiently low critical surface tension to prevent adhesion to the lithium. The polymer may be a coating on the surface of rolls used to roll the lithium, or may be in the form of sheeting enclosing or facing the lithium, which does not adhere to the lithium and is peeled off the lithium strip after rolling. While this method facilitates the rolling operation, which produces the thin lithium strip, it does not improve the efficiency of assembling the delicate lithium strip into electrical devices.

Numerous variations of the materials and structure of individual cell electrodes have previously been described, with the emphasis on the chemcial and electrical performance of the materials and with little attention to the assembly process itself. For example, British Pat. No. 1533279 describes the use of an adherent thin coating of a vinyl polymer film on the surface of lithium strip electrodes for lithium/thionyl chloride cells to prevent electrode passivation, which tends to occur on storage of that particular kind of cell. The vinyl polymer film is insoluble in the thionyl chloride and must not be degraded or decomposed in the presence of the same. It must be sufficiently thin to permit ion transfer between the lithium and the thionyl chloride as required for current flow in operation of the cell. It is stated, though not demonstrated in the examples of the patent, that the vinyl polymer film may also serve as the sole electrode separator of the cell or may permit the use of a thinner separator than would normally be required. Somewhat thicker films of the vinyl polymer are recommended for that purpose, but it is made clear that the ion transfer needed for acceptable electrical performance of the cell will be adversely affected by thus increasing the film thickness. Electrode separators of polystyrene are described in U.S. Pat. No. 4,315,602 for alkaline cells, the separators again being necessarily thin enough to permit ion transfer.

SUMMARY OF THE INVENTION

This invention provides an article for use as an electrode in an eletrochemical device, comprising
(a) sensitive eletrode material
(b) a flexible layer of protective material, at least part of which is swellable by electrolyte liquid with which it will come into contact in said device, which layer in its non-swollen state protects said electrode material, and which layer is ready to function as an electrode separator when said article is used to provide an electrode in an electrochemical device; the electrode material having been deformed so as to decrease its thickness while in contact with the protective material, thereby substantially increasing its surface area.

DETAILED DESCRIPTION OF THE INVENTION

Figure 1:
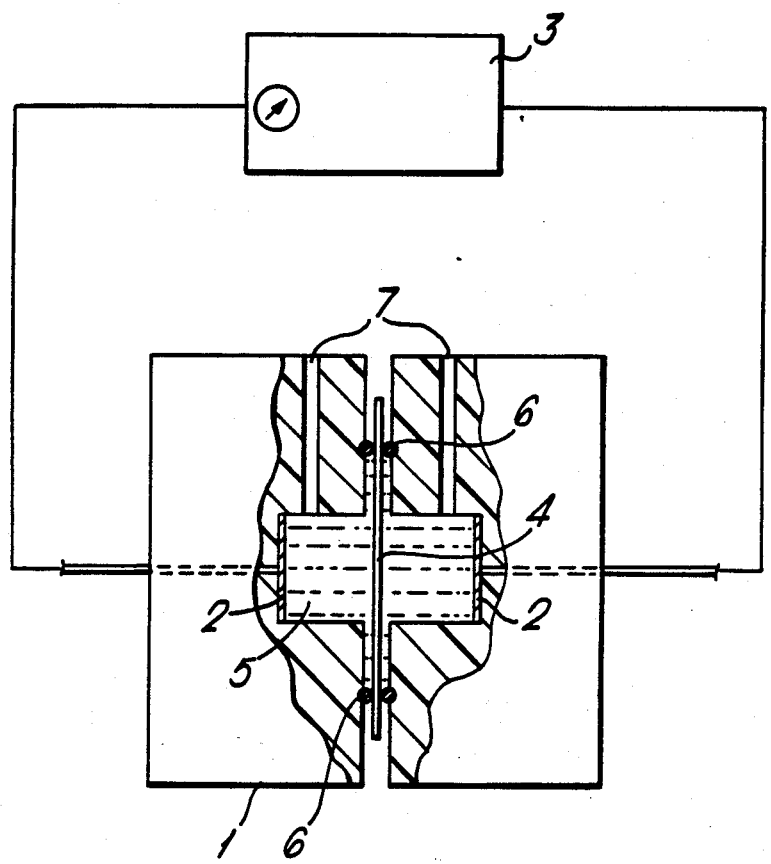
FIG. 1 depicts in cross-section a conductivity cell used in measuring the conductivity of materials of this invention.

The present invention provides articles whereby significant improvements in electrical device assembly processes can be achieved, as hereinafter described.

The invention provides an article comprising sensitive electrode material protected by a flexible layer of protective material which layer is ready to function as an electrode separator when the article is used to provide an electrode in an electrical device, the protective material being swellable by liquid with which it will come into contact in the said device. By thus providing liquid-swellable electrode separator layers, the present invention makes possible the use of protective layers which protect the electrode material from damage and contamination without unacceptably affecting electrical performance.

This has the advantage that the flexible protective layer permits the development of assembly processes which conveniently include the step of deforming the sensitive electrode materials while protected by the protective material, for example to reduce the thickness of the electrode material, and/or the step of arranging it in a desired form such as a coiled electrode, as will be further described hereinafter. For this purpose the electrode material may advantageously be a metal which is malleable under temperatures and pressures which do not unacceptably damage the protective layer.

The invention also gives rise to advantageous articles suitable for feeding to automatic equipment capable of assembling the said electrical device. The realisation that the protective material, whether adherent to or merely associated with the electrode material in this form of article, will help the sensitive electrode material to withstand the stresses of automated assembly thus leads to important processing advantages. Adherent protective layers are preferred, for which purpose the layer may have suitable surface properties, such as surface asperities greater than one micron. The feedable article is preferably in the form of an elongate strip of sufficient length to make a plurality of the said electrical devices. The protective layer may be applied by any convenient method, for example pressure lamination, solvent coating, or by melt extrusion which is new and advantageous for electrode materials.

The layer of protective material is preferably able to survive mechanical deformation of the electrode material in the sense that it will retain its integrity and maintain a useful degree of protection both against mechanical damage and against contamination of the electrode material after a significant amount of deformation, for example for the aforementioned purposes. The difficulty of defining precisely the amount of deformation which the protective material must survive will not, it is believed, defeat the commonsense of practical readers in deciding whether or not a given protective layer meets this requirement. Brittle layers which would crack so as to reduce the protection unacceptably are thus undesirable, as are materials which would react unacceptably in other ways to such treatment, for example very thin layers which would become unacceptably scuffed or torn.

The statement that the protective material is "ready to function" as an electrode separator will be understood to mean that the protective material will so function without further processing or alteration when the article is used as aforesaid. This is because the protective material is liquid swellable, preferably to an extent allowing it to be permeated by electrolyte liquid present in the electrical device in use. The permeation in practice is controllable by suitable selection of protective materials, swellability, and permeating fluids to suit specific end uses. It is an advantage of the present invention that even the more swellable materials will provide useful protection against contamination of the electrode material. This is especially advantageous in connection with electrode materials which may react violently with certain contaminants, for example alkali metals with water, since the protective material will reduce the likelihood of violent reaction.

The protective material thus acting as an electrode separator, pre-assembled with the electrode material, eliminates some of the problems of handling and aligning electrodes and separators during the assembly of the electrical devices, and facilitates automated processing.

It will be understood that the sensitive material may require protection for various reasons, for example materials which are subject to attack by atmospheric gases or moisture during storage; materials which may react prematurely with liquid with which they may come into contact during assembly materials which are subject to poisoning by contaminants during storage; and materials which lack physical strength or integrity and thus require protection from physical damage. The invention is especially useful for materials which require physical protection owing to physical weakness while permitting access of fluids to the material in use. By suitable selection of its ingredients, the protective material can also be made to perform other secondary functions, for example providing chemical reactants or catalysts in a porous layer on the surface of the sensitive material.

If desired, the protective material may have an overlying removable layer of relatively fluid-impermeable material to provide extra protection, the removable material being the same as, or different from, the underlying protective material and preferably being a substantially impervious film (e.g. Saran), which will be removed prior to assembly of the article in an electrical device.

It is a further advantage of the present invention that the electrode article may be provided in a form, preferably a long, continuous strip, for feeding to equipment capable of assembling successive portions of the article into a succession of the electrical devices as aforesaid, preferably automatically and continuously. The advantages of such an automated process over the piece-by-piece hand assembly methods hitherto used in the absence of the articles according to this invention, especially for alkali metal or alkaline earth metal electrode materials, will be appreciated.

The articles according to this invention can be assembled with the opposing electrode material and other components of the electrical device with fewer difficulties than are encountered in handling and aligning unprotected electrode materials, especially reactive metals such as alkali metals or alkaline earth metals. The anode or the cathode, or both, of suitable electrical devices, for example electrical cells, may be provided by way of articles according to this invention, reactive metal anodes, especially lithium anodes, for electrical cells, especially non-aqueous cells, being an important practical application of the articles. The articles may include other components, for example current collector layers, as known per se, on part of the electrode material, e.g. on one major surface of a flat strip electrode. Such current collector layers may be overlaid by insulating material such as the protective electrode separator material of the present invention, or may provide the sole protection on one side of the electrode with the swellable material on the other side. Other arangements may be contemplated to suit other additional components incorporated in the articles of this invention.

This invention is especially useful in relation to reactive metal electrodes such as alkali metal or alkaline earth metal electrodes, especially lithium electrodes for lithium cells. Production of thin sheet electrodes of these and other materials can be facilitated by deforming the electrode material, for example by rolling, while in contact with the layer of protective material so as to decrease the thickness of the electrode material or otherwise alter its form or surface configuration. In this way, thin sheets of lithium, for example of about 0.075 millimeters thickness, which would otherwise be difficult and expensive to make and handle, can be produced from more readily available 0.25 millimeter strip.

The invention includes electrodes for electrical devices formed of the polymer-protected electrode articles, and electrical devices, including such electrodes.

The invention also includes methods of making the protected electrode articles and methods (especially automated methods) of making an electrical device incorporating the protected electrode articles. The latter method may include the steps of making the protected electrode article as described above, and of bringing the article into contact with an electrolyte liquid and allowing the liquid to permeate the layer of polymeric material in order to make contact with the electrode material.

Suitable protective materials, which can readily be selected by simple trial and error to suit the swelling liquid in question, include polymers, preferably organic polymers, such as polymers of compounds with polymerizable double bonds and condensation polymers of condensable compounds.

The protective material preferably will not interact with the electrode material, although beneficial interactions are not excluded from the invention. Cross-linked protective materials, especially polymers cross-linked by ionising radiation to 40%, preferably at least 60%, gel contents, may have beneficial temperature resistance and other properties, and cross-linking of soluble polymers can often be used to produce swellable materials suitable for the present purposes.

An example of the preparation of swellable protective material will now be described to illustrate the invention.

EXAMPLE 1

Swellable Material Polymeric Acrylonitrile Type A-7

Method

A 50% solution of the above polymer was made up in dimethylformamide (DMF). From this solution thin films were solvent cast, dried under vacuum at room temperature and irradiated to 5 Mrads in an electron beam.

Swelling characteristics were tested in molar lithium bromide in acetonitrile.

Conductividy measurements were also made as a function of time in a cell as described below.

RESULTS

The material swells noticeably in the above electrolyte.

| CONDUCTIVITY RESULTS: | |
| --- | --- |
| Specific Conductance Ohm $^{-1}$cm$^{-1}$ | Time Mins |
| $4.62 \times 10^{-3}$ | 0 |
| " | 40 |
| " | 75 |
| " | 120 |

Films, produced as above, were evaluated for conduction through their thickness time of contact with suitable solvents. The conductivity cell as shown in FIG. 1 of the accompanying drawings was used for the evaluations. As shown in FIG. 1, the cell comprises a container 1 and 2 incorporating electrodes 2 of stainless steel connected to a DC conductance bridge (3). A sample 4 and 5 to be tested is sealed into the test chamber by sealing gaskets (6), and the necessary conductive liquid is introduced via feed ports (7).

The electrolyte 0.5M LiCF$_3$SO$_3$ in 50/50 dimethoxyethane/propylene carbonate was added and the conductance of the film measured using electrodes (2) in conductance bridge (3).

EXAMPLE 2

Figure 2:
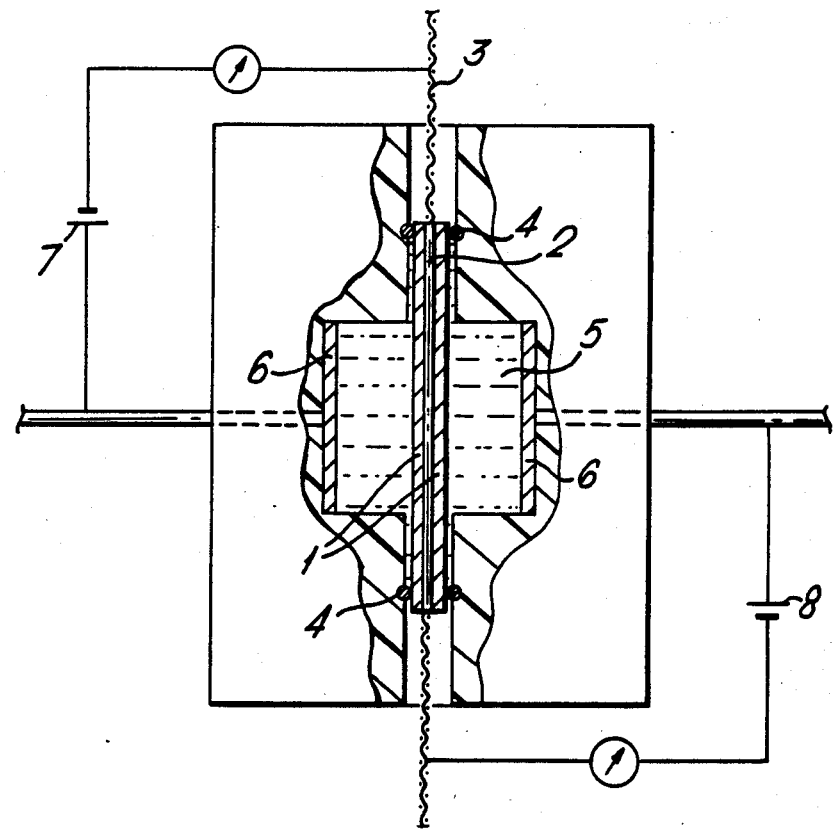
FIG. 2 depicts in cross-section another conductivity cell used in measuring the conductivity of materials of this invention.

Films prepared as in Example 1 using (A) polyacrylonitrile A7 and (B) Kynar 806 (a nitrile rubber of 40% acrylonitrile content) were press laminated with lithium metal at a temperature of 110° C., and the laminate was evaluated using the conductivity test cell shown in FIG. 2 of the accompanying drawings. Referring to FIG. 2, a sample of the laminate carrying the film (1) with connections to the lithium (2) made by pieces of nickel mesh (3) was sealed in the conductivity cell by O-rings (4). The electrolyte 0.5 MOLAR LiCF$_3$SO$_3$ in 50/50 DME/PC was added and the conductance of the polymer measured on both sides of the lithium using electrodes (6) in conductance bridges (7,8). Comparison was made between uncrosslinked polymer and polymer which had been cross-linked by exposure to 10 M-rads of electron beam radiation.

| | Results: (conductivity ohm$^{-1}$ cm$^{-1}$) | |
| --- | --- | --- |
| | Uncrosslinked | Crosslinked |
| A | $3.29 \times 10^{-3}$ | $3.85 \times 10^{-3}$ |
| B | $2.98 \times 10^{-5}$ | $2.04 \times 10^{-4}$ |

EXAMPLE 3

Figure 3:
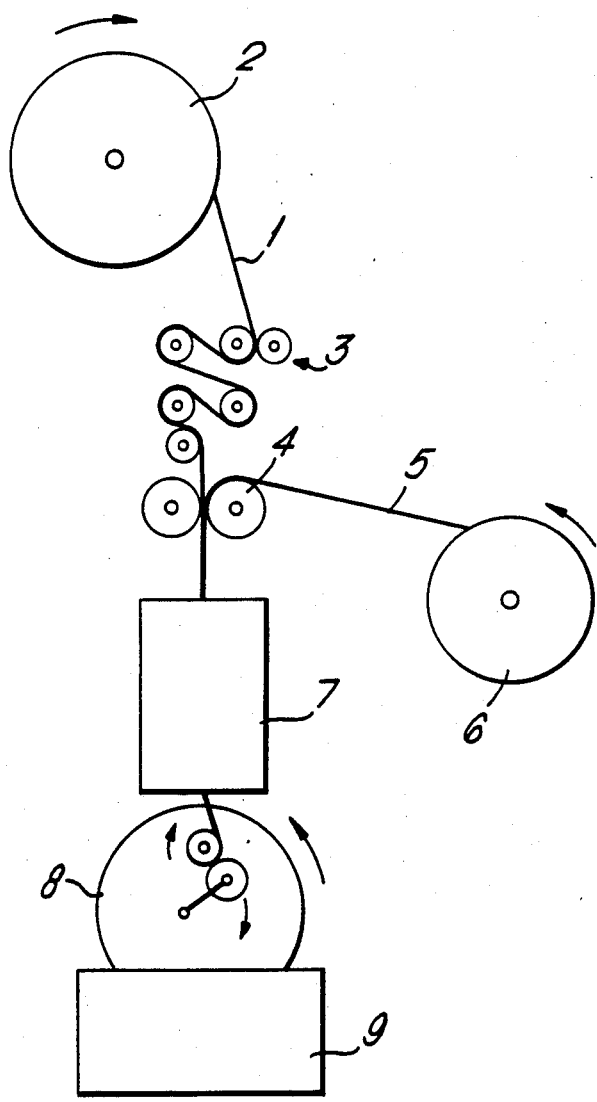
FIG. 3 is a schematic of equipment for a method of making an electrical device according to this invention.

FIG. 3 of the accompanying drawings illustrates schematically electrical cell production equipment capable of performing a method of making an electrical device according to this invention.

Referring to FIG. 3, a strip (1) of lithium anode material protected by swellable polymeric protective material according to the invention is fed from a supply roll (2) via feed rolls (3) to lay-up rolls (4) where a strip (5) of cathode material from feed roll (6) is closely aligned with the protected anode, the protective material carried by the lithium anode being between the anode and the cathode. The aligned anode/cathode assembly then proceeds to a spool threading unit (7) and thence to a spool winding unit (8) wherein the assembly is coiled or spooled to provide a coiled electrode assembly The coiled assembly then passes to the spool casing unit (9), where the coiled assembly is sealed in a cell casing together with suitable electrolyte liquid. Suitable practical embodiments of the production equipment thus schematically described can readily be devised.

The electrode article according to this invention may be assembled with a melt extruded cathode material, preferably an electrically conductive composite comprising polymeric material and a suitable cathodic filler, for example polyethylene oxide filled with manganese dioxide. The cathode may be extruded directly onto the protected anode material and other components such as current collectors to produce an electrical device.

It may be desirable to cause the cathode, whether extruded or not, to be porous so as to permit access of electrolyte liquid through the cathode to the other components of the device.

We claim:

1. A method of making an electrochemical device, comprising:
    (a) providing a body of sensitive electrode material;
    (b) assembling together said electrode material and a layer of flexible protective material, at least part of which protective material is swellable by electrolyte liquid with which it will come into contact in said device, permitting the electrolyte to permeate through it, which protective material in its non-swollen state protects said electrode material, and which protective material is ready to function as an electrode separator when said electrode material is used as an electrode in an electrochemical device;
    (c) deforming said electrode material so as to decrease its thickness, thereby substantially increasing its surface area, while said electrode material is in contact with said protective material; and
    (d) inserting the assembly of said electrode material and said protective material into liquid electrolyte in an electrochemical device to cause the protective material to swell so that its permeability is increased sufficiently to enable it to function as a separator in the device.

2. A method as claimed in claim 1, in which the electrode material is an alkali metal or an alkaline earth metal.

3. A method as claimed in claim 2, in which the electrode material is lithium.

4. A method according to claim 1 wherein in the said assembling step said protective material is applied to said electrode material so as to adhere to at least part of the surface of said electrode material.

5. A method according to claim 1 wherein in said assembling step said protective material is melt extruded onto the surface of said electrode material.

6. A method according to claim 1 wherein in said assembling step said protective material is pressure-laminated onto said electrode material.

7. A method according to claim 1 wherein in said deforming step the function of said protective material as an electrode separator is enhanced.

8. A method of making an electrochemical device which comprises an electrode located in a liquid electrolyte, the method comprising:
(a) crosslinking a sheet of polymeric material which, in the absence of the crosslinks, would be soluble in the said liquid electrolyte;
(b) before or after the crosslinking step, applying the sheet of polymeric material to a body of reactive metal electrode material so as to protect the body; and
(c) positioning the body of electrode material and the protective polymeric material in the electrolyte, the electrolyte causing the sheet of polymeric material to swell so that its permeability is increased.

9. A method as claimed in claim 8, which includes the step of reshaping the body of electrode material while protected by the sheet of polymeric material, so as to increase the surface area and to decrease the thickness of the body.

10. A method as claimed in claim 9, in which the sheet of polymeric material is reshaped together with the body of electrode material.

11. A method as claimed in claim 8, in which the sheet of polymeric material is applied to the body of electrode material by melt extrusion.

12. A method as claimed in claim 8, in which the sheet of polymeric material is applied to the body of electrode material by pressure lamination applied to the body of electrode material by pressure lamination.

13. A method as claimed in claim 8, in which the body of electrode material comprises an alkali metal or an alkaline earth metal.

14. A method as claimed in claim 13, in which the body of electrode material comprises lithium.

15. A method as claimed in claim 8, in which the polymeric material comprises polyethylene oxide.

16. A method according to claim 1, further comprising the step of cross-linking said protective material.

17. A method according to claim 1 further comprising the step of cross-linking said protective material with ionizing radiation.

* * * * *